(12) United States Patent
Nash

(10) Patent No.: US 6,894,693 B1
(45) Date of Patent: May 17, 2005

(54) MANAGEMENT OF LIMITED RESOURCES IN A GRAPHICS SYSTEM

(75) Inventor: Reuel W. Nash, Newark, CA (US)

(73) Assignee: Vicarious Visions Inc., Troy, NY (US)

( * ) Notice: Subject to any disclaimer, the term of this patent is extended or adjusted under 35 U.S.C. 154(b) by 108 days.

(21) Appl. No.: 10/074,150

(22) Filed: Feb. 11, 2002

Related U.S. Application Data

(60) Provisional application No. 60/267,904, filed on Feb. 9, 2001.

(51) Int. Cl.⁷ .............................................. G06T 11/40
(52) U.S. Cl. ........................ 345/552; 345/522; 345/582
(58) Field of Search ................................ 345/552, 522, 345/501, 506, 502, 505, 530, 545, 553, 558, 557, 582

(56) References Cited

U.S. PATENT DOCUMENTS

| | | | | |
|---|---|---|---|---|
| 5,010,515 A | * | 4/1991 | Torborg, Jr. ................. | 345/505 |
| 5,315,696 A | * | 5/1994 | Case et al. ................... | 345/522 |
| 5,774,132 A | * | 6/1998 | Uchiyama .................... | 345/552 |
| 5,793,386 A | * | 8/1998 | Larson et al. ................ | 345/522 |
| 5,969,728 A | * | 10/1999 | Dye et al. .................... | 345/553 |
| 6,157,384 A | * | 12/2000 | Oka et al. .................... | 345/848 |
| 6,157,996 A | * | 12/2000 | Christie et al. ............. | 712/218 |
| 6,339,427 B1 | * | 1/2002 | Laksono et al. ............. | 345/553 |
| 6,404,428 B1 | * | 6/2002 | Radecki et al. ............. | 345/419 |
| 6,587,113 B1 | * | 7/2003 | Baldwin et al. ............ | 345/557 |

* cited by examiner

*Primary Examiner*—Kee M. Tung
(74) *Attorney, Agent, or Firm*—Fenwick & West LLP

(57) ABSTRACT

A graphics application generates graphics data, including draw commands and instructions to load textures. The application loads draw commands into a list and associated logic for later transfer to graphics hardware. Draw commands may be associated with one or more predicate functions that prevent the commands from being transferred before the graphics hardware is ready to receive them. The application further loads textures into a texture memory or stores instructions for loading textures in a texture load list. A development environment allows such applications to be developed without requiring developers to specifically code these functionalities.

32 Claims, 7 Drawing Sheets

MANAGEMENT OF LIMITED RESOURCES IN A GRAPHICS SYSTEM

CROSS REFERENCE TO RELATED APPLICATIONS

This application claims the benefit under 35 U.S.C. § 119(e) of U.S. Provisional Application No. 60/267,904, filed Feb. 9, 2001, which is hereby incorporated in its entirety by reference.

BACKGROUND OF THE INVENTION

1. Field of the Invention

The present invention relates generally to the management of limited resources in a computer graphics system and, in particular, to improving the performance of graphics systems through pre-loading and synchronization of draw commands and textures.

2. Description of Background Art

Computer games and other graphics-intensive software applications demand increasing performance from the graphics hardware upon which they run. However, hardware resources are limited, e.g., by memory, bus availability, and processor speeds, which in turn limit the performance of the software. Therefore, optimizing the use of these limited resources available to application developers is critical to the overall performance of the games and other applications themselves—and to their success.

One of the limited resources in a graphics system is texture memory. On game consoles, for example, a game application must typically move multiple textures through the texture memory many times to draw a single display frame. In typical systems, 60 to 100 or more display frames are drawn every second, resulting in a need for a large texture memory and high memory bandwidth.

Another limitation is the speed of the processors. Graphics-intensive applications typically have some CPU-limited calculations (e.g. scene-graph traversal, physics, animation) that generate data to be sent to the transformation and lighting (T&L) processor, and eventually to the pixel processor. Typical double-buffered graphics systems do not allow drawing to occur while the target frame buffer memory (i.e., the front buffer in a double-buffered system) is being displayed. Because of this limitation, applications must wait until a vertical retrace before processing graphics commands for the next frame. This waiting wastes a significant amount of CPU time and further underutilizes the T&L and pixel processors during this time.

FIG. 1 is a timing diagram of a typical graphics system, showing the processing events that occur for a particular frame between vertical retraces 10. FIG. 1 illustrates an example of a double-buffered graphics system, where a pixel processor writes the image of a frame onto a back buffer. The back buffer becomes the front buffer during a "swap event" (e.g., a vertical retrace 10), and the image stored in this buffer is displayed on the monitor or other display screen. (An example of a double-buffered graphics hardware architecture is described in greater detail in connection with FIG. 3.)

In existing systems, the application is typically held off from any application processing 15 until a buffer swap event occurs. This prevents the pixel drawing processor from writing to the displayed buffer and thus altering the image before it is displayed on the monitor. But it also wastes processing time because the application typically has some CPU-bound compute time (e.g., scene graph traversal, physics calculations, animation, etc.) before the application sends draw commands to the T&L processor and textures to the texture memory. During this time, represented as T1 in FIG. 1, the transformation and lighting (T&L) processor and the pixel processor are idle. After this time T1, the application sends draw commands to the T&L processor for processing 25 and begins to load 20 textures into texture memory for use with the draw commands. A short time after draw commands are sent and textures begin to load, the pixel processor begins to use the draw commands and textures to draw 30 pixels for the frame into the back buffer.

Buffer swap events occur in synch with the vertical retrace 10 of the monitor, and the period between buffer swap events may be any integral multiple of the vertical scan period (i.e., the time between vertical retraces 10). After each vertical retrace 10, the system displays 40 the contents of the front buffer. Importantly, if the pixel drawing 30 is not completed before the system's next vertical retrace 10 (as shown by the dotted extension arrow 30' in FIG. 1), the system does not perform a swap of the back and front buffers because the next frame is still being drawn on the back buffer. In this case, the front buffer does not change, and the monitor continues to display 40 the same frame, thereby causing the frame rate performance to drop and thus diminishing the quality of the display. Alternatively, when the vertical retrace 10 occurs and the pixel drawing 30 is not finished for the frame, the systems does perform a buffer swap. In this case, the partially drawn buffer is displayed on the monitor, which results in display artifacts such as "tearing." On the monitor, tearing causes the next displayed frame to be composed of a portion of the last frame and a portion of the next frame, which is also undesirable.

A significant factor that leads to inefficiency in existing systems is the loss of processing time due to the system's waiting for a vertical retrace to begin before processing the next frame. Accordingly, it is desirable to reduce this inefficiency to improve performance of graphics-intensive software by attempting to complete the pixel drawing for any given frame before the next vertical retrace. This advantageously maintains a high frame rate. Moreover, it can be appreciated that reducing the wasted processing time, illustrated by $T_1$, allows pixel drawing to begin earlier, which in turn increases the probability that the pixel drawing will be completed before the next vertical retrace.

These constraints are complicated by the structure of typical graphics system hardware, which allows for asynchronous transformation and drawing processing and asynchronous texture loading. Having the application perform synchronization operations decreases available processing time for the CPU, T&L processor, and pixel processor. Moreover, implementing synchronization operations with the application is undesirably complex. In such a case, the application would have to determine the time before a texture is needed to begin its loading.

SUMMARY OF THE INVENTION

To overcome some of the problems of existing graphics systems, an embodiment of the present invention allows a graphics application to generate graphics commands for the next display frame before the swap event. In accordance with a preferred embodiment of the invention, a draw command list and associated logic are included in a graphics system. Rather than pausing the application's processing until a swap event, the task of preventing drawing before the frame buffer is available (e.g., until a swap event has occurred in a double-buffered system) is shifted to the draw command list and its associated logic. In this way, the application is allowed to "run ahead" by filling the draw command list with draw commands, or references thereto. Advantageously, a combination of buffering and synchronization techniques reduces the processing time wasted while waiting for a swap event and texture loading, thus increasing the performance of the graphics system.

In one embodiment, an application generates draw commands for transfer to the T&L processor. Rather than wait until the draw commands can be transferred to the T&L processor, the application adds the draw commands to a draw command list. In one embodiment, entries in the draw command list include one or more draw commands (preferably, by including references to the draw commands). Each entry may also include a set of predicate functions that must be satisfied before the associated draw commands are transferred to the T&L processor. In response to various system functions that may cause the predicate functions to be satisfied, interrupt service routines are called to determine whether all of an entry's predicate functions are satisfied. If so, the associated draw commands are transferred to the T&L processor, and system processes the next entry in the draw command list. The entries are preferably processed in the order in which they are added to the draw command list. In an embodiment, the draw command list is implemented as a FIFO queue.

In an embodiment, entries in the draw command list include one or more predicate functions that are satisfied when a swap event occurs. With this predicate function, the draw commands in this entry and all subsequent entries are held in the draw command list until the swap event. Accordingly, this predicate function allows the application to continue to run and generate draw commands for a next frame while ensuring that the draw commands for the next frame will not be sent too soon to the T&L processor (e.g., before the swap event). In another embodiment, entries in the draw command list include one or more predicate functions that are satisfied when one or more textures are loaded in the texture memory. These predicate functions allow the application to continue to issue draw commands without having to manage texture loading synchronization or wait for texture memory to become available.

In one embodiment, textures are loaded into the texture memory by the application as the graphics data are processed. Textures are placed in the texture memory according to a linear, first-fit algorithm, and they are unloaded after the pixel processor uses them in conjunction with a draw command. In another embodiment, the application stores instructions for leading textures in a texture load list, preferably implemented as a FIFO queue, allowing the application to continue to run and generate graphical data. Advantageously, the application does not have to wait for texture memory to become available before issuing a texture load instruction.

In another aspect of an embodiment, a development environment is provided for producing an application in accordance with any of the embodiments described herein. The development environment combines program code received from a developer with the synchronization and list logic required to manage the transfer of draw commands and loading of textures. By including this functionality on a low level in the application development process that is "invisible" to developers, developers of computer games and other graphics applications obtain the benefits of the invention without having to specifically incorporate the functionalities in each piece of software they write.

DETAILED DESCRIPTION OF THE PREFERRED EMBODIMENTS

Figure 2:
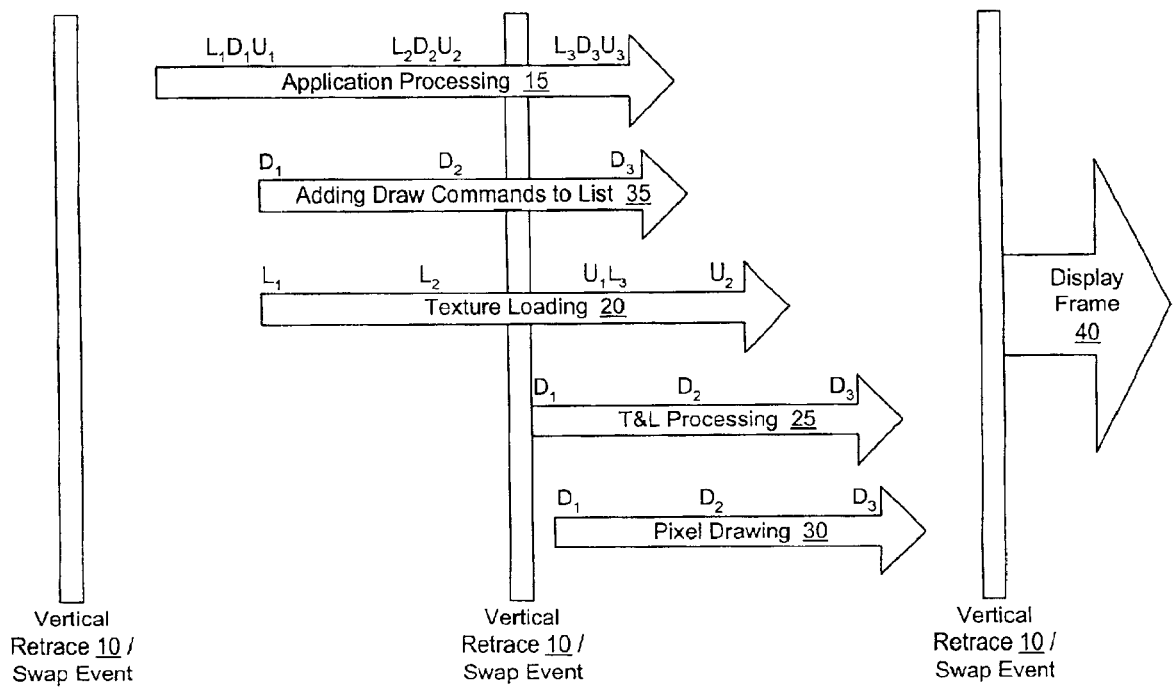
FIG. 2 is a timing diagram of one embodiment of the graphics system.

FIG. 2 is an event diagram that illustrates the processing that occurs for a particular frame according to a preferred embodiment of a graphics system. An embodiment of the hardware architecture of a double-buffered graphics system for performing the operations shown in FIG. 2 is described in greater detail in connection with FIG. 3.

Figure 1:
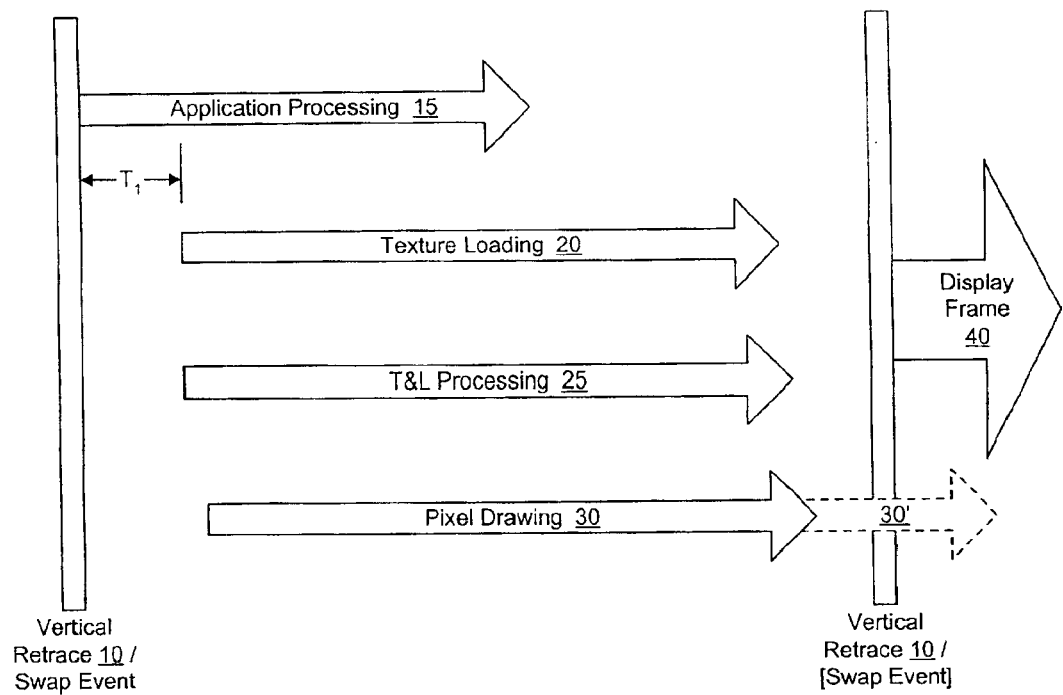
FIG. 1 is a timing diagram of a prior art graphics system.

Some of the advantages of the invention can be appreciated by comparing the operation of an embodiment of the invention shown in FIG. 2 with that of a typical system shown in FIG. 1. In FIG. 2, the application is allowed to process 15 graphics data for a next frame before the swap event (which in this example is synched with the monitor's vertical retrace 10). Preferably, the application begins to process 15 graphics data for the frame shortly after the application processing for the previous frame ends (not shown), which minimizes or eliminates the amount of time the CPU is idle. When the application processing 15 begins for the frame, the application typically has some CPU-bound compute time (e.g., scene graph traversal, physics calculations, animation, etc.) before the application can generate graphics data. When these initial calculations are completed, the application begins to generate draw commands and texture loading and unloading instructions, e.g., $L_1 D_1 U_1$.

In the diagram, $D_n$ denotes the nth draw command for the frame. $L_n$ and $U_n$ denote the loading and unloading, respectively, of a texture associated with the nth draw command. For simplicity, only three draw commands are shown for the application processing 15 in FIG. 2; however, the application typically generates thousands of draw commands to draw each frame. In a typical system, the draw command is a command to draw one or more polygons and map a specified texture thereon. Therefore, for one or more draw commands, the application processes instructions to load and unload the specified texture into the texture memory for use with the draw command. Although FIG. 2 shows the application processing 15 these commands and instructions in the order $L_n D_n U_n$, other embodiments of the application process them in different orders. Preferably, these embodiments require that each texture be loaded before the pixel processor processes the corresponding draw command.

Rather than send draw commands directly to the T&L processor, an embodiment of the application sends 35 the commands to a draw command list. In a preferred embodiment, the draw command list is a first-in-first-out (FIFO) queue resident in the RAM. (The draw command list is described in greater detail in connection with FIGS. 4A and B.) Shortly after the application generates the $L_1D_1U_1$, the $D_1$ command is added 35 to the draw command list. Likewise, the $D_2$ and $D_3$ commands are added 35 to the draw command list shortly after the application generated $L_2D_2U_2$ and $L_3D_3U_3$, respectively. Advantageously, the filling 35 of the draw command list begins during the previous frame display. In the example of FIG. 2, the draw commands $D_1$ and $D_2$ are added before the swap event, and the draw command $D_3$ is added after it.

As the graphics data are processed, the application also begins to load 20 textures into texture memory for use with the draw commands. Generally, textures are loaded into the texture memory after the application issues the draw command that uses the texture, unless the texture memory does not have sufficient memory to hold the texture. In one embodiment, if there is not enough texture memory to hold a texture, the application waits until one or more textures are unloaded from the texture memory so that there is sufficient free texture memory. In another embodiment, the application loads the textures into a texture load list, allowing the application to continue processing 15. The texture load list and associated logic then load the textures into the texture memory according to the availability of the texture memory. After the one or more draw commands that use a texture have been processed, the texture is unloaded or cleared from the texture memory. (Different embodiments for texture loading are described in greater detail below in connection with FIGS. 6 and 8.)

To prevent the pixel drawing processor from writing to the front buffer, in an embodiment the T&L processing 25 and pixel drawing 30 processes wait until the swap event before processing draw commands for that frame. Once the swap event occurs, the draw command list logic allows draw commands to be sent to the T&L processor from the draw command list. A short time after draw commands are sent to the T&L processor, the pixel processor begins to use the draw commands and textures to draw 30 pixels for the frame into the buffer. In the example of FIG. 2, the draw command list already contains draw commands $D_1$ and $D_2$ when the swap event occurs. Advantageously, this allows the T&L processing 25 and pixel drawing 30 to begin shortly after the swap event. If the back buffer is completed upon the next vertical retrace 10, a buffer swap is performed and the frame image is displayed 40 on the monitor.

The draw command list and associated logic enable the application to begin generating draw commands for a frame before the swap event occurs—as compared to existing systems as shown in FIG. 1. Accordingly, the application can process graphics data sooner while preventing pixel drawing to an active frame buffer. Because draw commands are generated sooner, pixel drawing 30 to the frame buffer can also begin sooner. Enabling pixel drawing 30 to begin sooner increases the likelihood that the frame buffer will be completely drawn by the next vertical retrace 10, whereby a buffer swap can be performed. The performance of the graphics system is thus improved.

Figure 3:
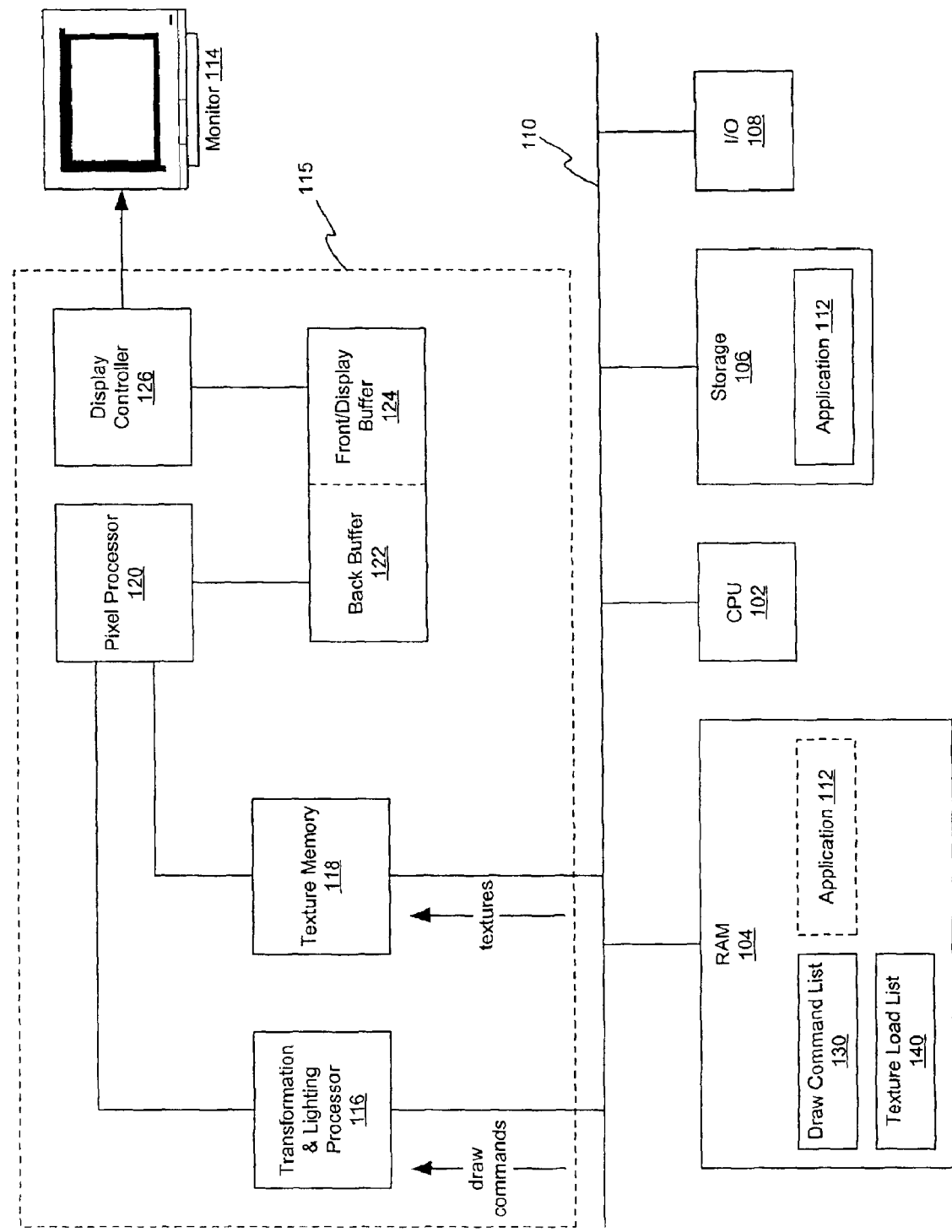
FIG. 3 is a block diagram of an embodiment of the graphics system in accordance with an embodiment of the present invention.

FIG. 3 illustrates an embodiment of a graphics system. The graphics system may be part of a personal game console, a computer system, or any other electronic device having graphics capabilities. As shown, the system comprises standard computer hardware, including a central processing unit (CPU) 102, random access memory (RAM) 104, storage 106, and one or more input/output (I/O) devices 108. The CPU 102, RAM 104, storage 106, and I/O device 108 are coupled by a standard bus 110. In one embodiment of a game console, I/O 108 includes one or more game controllers or joysticks for receiving input from a user. In an embodiment of a computer system, I/O 108 includes a keyboard, a mouse, and/or a joystick.

The CPU 102 is adapted to execute application 112, which comprises a computer game or other application that uses graphics. Application 112 is provided on an electronic storage 106. In various embodiments, the storage 106 comprises a removable cartridge, a CD, DVD, a computer hard drive, a computer disk drive, or other suitable electronic storage device. In another embodiment, the storage 106 is remote, coupled to the graphics system via a network such as the Internet.

The system further includes a graphics subsystem 115 coupled to the bus 110. The graphics subsystem 115 includes a transformation and lighting (T&L) processor 116, a texture memory 118, a pixel processor 120, a back buffer 122, a front buffer 124, and a display controller 126. The graphics subsystem 115 is adapted to process graphics commands and data from the application 112, generate frames of graphical images from the commands and data, and send the frames to a monitor 114. The monitor 114 may be a computer monitor, television, or any other display device capable of displaying an electronically generated image. For each frame, the application 112 typically generates many draw commands and sends many textures to the graphics subsystem 115. In one embodiment, the draw commands cause polygons filled with specified textures to be drawn to the frame.

The graphics subsystem 115 has two logically separate, asynchronous paths for receiving draw commands and textures from the application 112. The first path transfers draw commands to the T&L processor 116. The T&L processor 116 transforms a scene graph specified by the draw commands into the "screen space" utilized by the monitor 114. The second path loads textures into the texture memory 118, where the textures are stored until they are used in connection with a draw command. The paths are asynchronous because the transfer of draw commands occurs independently from the loading of textures.

In a preferred embodiment, the RAM 104 contains a draw command list 130 for storing draw commands generated by the application 112. As the application 112 generates draw commands, the application 112 adds the draw commands to entries in the draw command list 130. The draw commands are transferred from the draw command list 130 to the T&L processor 116 according to draw command list logic, preferably in the order the draw commands were added to the draw command list 130. In a preferred embodiment, draw commands are not transferred to the T&L processor 116 until their associated textures have been loaded and the swap event has occurred. (A process for transferring draw commands to the T&L processor 116 is described in more detail below in connection with FIG. 5.)

The pixel processor 120 uses the output of the T&L processor 116 and the textures to draw pixels to a back buffer 122. In a preferred embodiment, the back buffer 122 is a logical memory space adapted to hold data representing pixels to be displayed on the monitor 114. For example, in a system having a resolution of 800×600 and supporting a 32-bit color depth, the back buffer 122 contains a 32-bit memory location for each of the 480,000 pixels in the frame.

Once the pixel processor 120 has generated all of the pixels for a particular frame, the back buffer 122 contains the complete image of the frame to be displayed. The back buffer 122 is then logically swapped with the front buffer 124 (also called the display buffer) during a "swap event." The swap is performed, for example, by switching the addresses of the back and front buffers. The swap event preferably occurs during the monitor's vertical retrace. After the swap event, the pixel processor 120 can draw to the new back buffer 122.

The display controller 126 reads the front buffer 124 and sends the pixels contained therein to the monitor 114. In an embodiment, the display controller 126 reads the pixels in the front buffer 124 in an order logically equivalent to left to right on a line, from the top to the bottom line (i.e., a raster scan). The display controller 126 sends each pixel to the monitor 114, which displays the pixels according to well-known techniques. The monitor 114 has a given vertical scan frequency, or refresh rate, which is the number of times per second the monitor is refreshed (i.e., a frame is drawn). Typical monitors have vertical scan frequencies that range from 56 Hz to well over 100 Hz. In an 80-Hz monitor, for example, the monitor displays up to 80 frames per second. The time between drawing the bottom-right pixel of one frame and the top-left pixel of the next frame is the vertical retrace interval.

The system shown in FIG. 3 is a double-buffered system because it uses two buffers (the back and front buffers) for drawing and displaying frames. In other embodiments of the invention, the system uses a single buffer, and yet other embodiments use three or more buffers. The use of additional buffers allows the system to begin drawing a subsequent frame before the system has finished displaying a current frame on the monitor. Although a double-buffered system is shown for illustration purposes, the invention can be practiced by any other suitable graphics hardware configuration.

In addition, many other configurations and alternate embodiments of the invention are envisioned. In one embodiment, the RAM 104, texture memory 118, back buffer 122, and front buffer 124 are part of the same memory, and in other embodiments, any of these memories could comprise multiple memories coupled together. The draw command list 130 or texture load list 140 may alternatively be stored in a memory on the graphics subsystem 115, or in storage 106. In another embodiment, the pixel processor 120 is built into the T&L processor 116. Accordingly, the invention could be practiced by any of a wide variety of graphics hardware configurations capable of performing the techniques described herein.

The graphics system shown in FIG. 3 can be thought of as a multi-stage graphics system, where a graphics pipeline extends from the initial graphics data issued by the application to the ultimate manifestation of the associated graphics on the monitor 114. The buffering of draw commands and texture loading instructions occurs in one stage. In a subsequent stage, the draw commands are processed in the T&L processor 116, and the textures are loaded into the texture memory 118. In yet another stage, the pixel processor 120 uses the draw commands and textures to draw pixels on the back buffer 122.

Figure 4A:
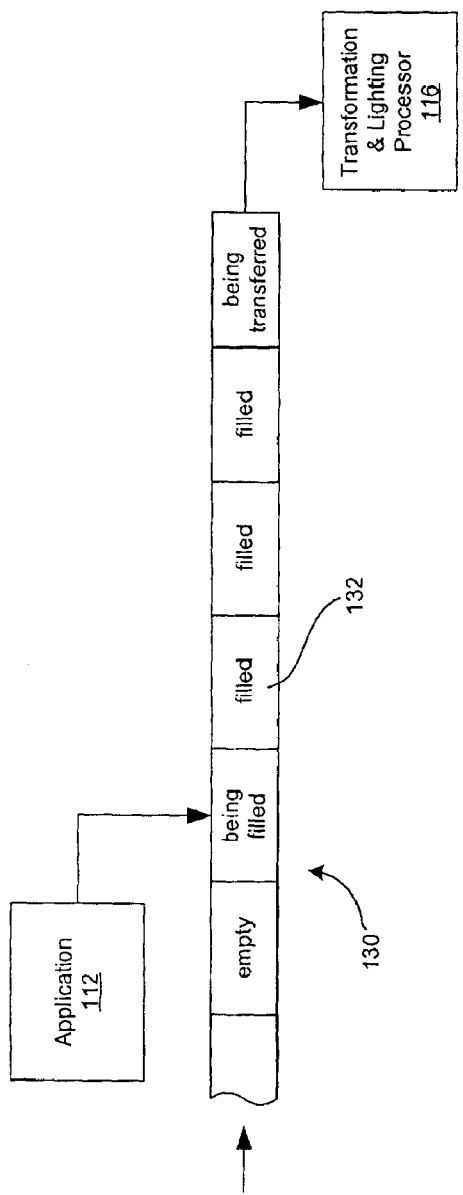
FIGS. 4A and B are diagrams of an embodiment of the draw command list.

FIG. 4A illustrates an embodiment of a draw command list 130. The draw command list 130 is preferably a FIFO queue. As used herein, the "first" entry in a list is defined to be the entry that has been in the list for the longest time (and hence, the next "out"), and the "last" entry is the entry most recently added to the list. In one implementation, the draw command list 130 includes about 20 entries 132 in a circular list, each entry 132 holding from 16 to 64 kilobytes of data. A list of this size is typically large enough to hold draw commands waiting to be transferred to the T&L processor 116. Alternative embodiments use variations on the FIFO queue or other data structures to hold the draw command list 130.

Figure 4B:
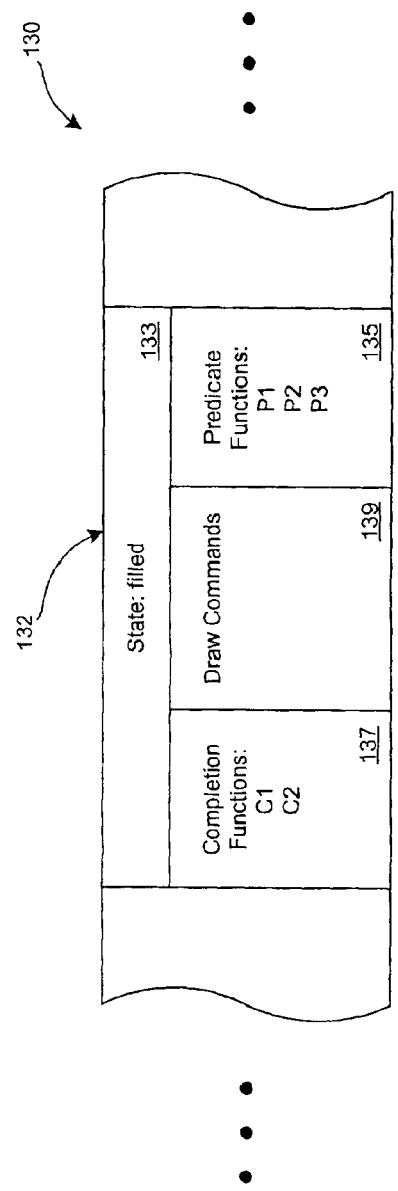

FIG. 4B shows an entry 132 of the draw command list 130 of FIG. 4A. As illustrated, each entry 132 includes an associated state data field 133, an optional predicate function data field 135, an optional completion function data field 137, and a draw command data field 139. The data in the state field 133 describe the status of the entry 132. In one embodiment, the state field 133 can be: "empty," "being filled," "filled," or "being transferred." An entry 132 is "empty" when it contains no draw commands; "being filled" when the application 112 is adding draw commands to the entry 132; "filled" when the entry 132 contains draw commands; and "being transferred" when the draw commands in the entry 132 are being transferred to the T&L processor 116.

The draw command data field 139 preferably contains either one or more actual draw commands or pointers to the draw commands in memory (e.g., RAM 104). Because pointers to draw commands are typically smaller than the draw commands themselves, the use of pointers in the draw command field 139 saves memory and bus bandwidth.

The predicate function data field 135 optionally stores a set of predicate functions. A predicate function indicates a condition that must be satisfied before the draw commands in the entry 132 are transferred to the T&L processor 116. Preferably, the predicate functions prevent draw commands from being transferred to the T&L processor 116 until the corresponding textures are loaded into the texture memory 118. Predicate functions also preferably prevent draw commands from being sent to the T&L processor 116 before the affected screen buffer becomes the back buffer. In an embodiment, when the application processes a draw command that uses a particular texture, the application 112 adds a predicate function to the predicate function data field 135 in the entry 132 associated with that draw command, wherein the predicate function requires the texture to be loaded before the draw command is transferred to the T&L processor 116. In addition, the predicate function data field 135 may be empty, in which case the draw commands 139 are transferred to the T&L processor 116 when the entry 132 is the first in the draw command list 130.

The completion function data field 137 optionally stores a set of completion functions. After the application 112 transfers the draw commands to the T&L processor 116, the application 112 executes each of the completion functions in the completion function data field 137 associated with the draw commands. An example of a completion function sends a message to the CPU 102 that its associated draw commands have been transferred to the T&L processor 116. This function serves to notify the CPU 102 that the texture associated with the draw command may be unloaded to relinquish space in the texture memory.

In one embodiment, the logic for controlling the draw command list 130 is implemented with interrupts and interrupt service routines (ISRs). In an embodiment, these functions include the following:

Add draw command to the draw command list: This function adds a draw command into the draw command data field 139 of the next empty entry 132 and then changes the entry state field 132 to "filled." If no empty entries 132 are available (i.e., the draw command list 130 is full), the application 112 waits for one to become empty. This function also attempts to transfer the entry (described below).

Add a predicate function to the currently filling entry: This function adds one or more predicate functions to the predicate function data field 135 of the entry 132 that is being filled or to a particular entry 132.

Add a completion function to the currently filling entry: This function adds one or more completion functions to the completion function data field 135 of the entry 132 that is being filled or to a particular entry 132.

Attempt to transfer the entry: This function attempts to transfer the draw commands in the draw command data field 139 of an entry 132 to the T&L processor 116. This function is called by the main thread of the application 112 (while putting an item into an entry or while flushing the entry) or an ISR (which may change the state of one or more predicate functions). If the transfer engine (e.g., DMA hardware) is idle and all of the predicate functions in the predicate function data field 135 are satisfied, the draw commands are transferred to the T&L processor 116. In one embodiment, predicate functions are deleted from the predicate function data field 135 as they are satisfied. In another embodiment, predicate functions are marked to indicate when they have been satisfied.

Execute the list of completion functions: This function is executed by an ISR after the draw commands associated with an entry 132 are transferred to the T&L processor 116. This function calls each of the completion functions in the entry's completion function data field 137 in order and then delete the list.

Mark an entry empty: This function is executed by an ISR after the draw commands associated with an entry 132 are transferred to the T&L processor 116. If the main thread of the application 112 is waiting for an empty entry (i.e., the draw command list 130 is full), it will be satisfied by this action.

Flush the entry: This function forces the state data field 133 of the first entry 132 to be marked "filled," and an attempt to transfer it to the T&L processor 116 is made.

These functions enable the basic FIFO functionality of the draw command list 130 and the sophisticated control thereof. The draw command list logic may be incorporated within the application 112, or it may run on the CPU 104 as a separate executable.

Figure 5:
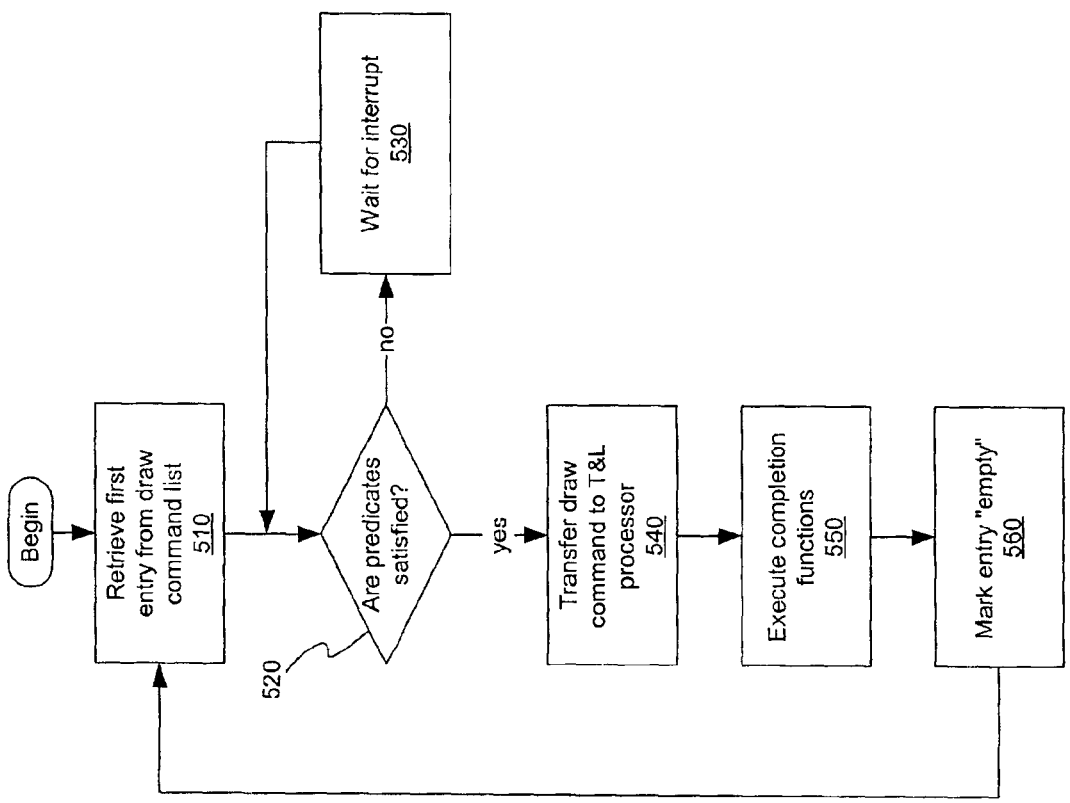
FIG. 5 is a flow of a process for transferring draw commands to the T&L processor.

FIG. 5 illustrates a flow of an embodiment for transferring draw commands to the T&L processor 116. The draw command list logic retrieves 510 the first entry from the draw command list 130. The logic then determines 520 whether all of the entry's predicate functions are satisfied. In one embodiment, the logic deletes the predicate functions as they are satisfied. This process effectively ensures that the current entry's draw commands are not transferred to the T&L processor 116 until the associated textures have been loaded and the frame buffer is available for receiving pixels.

If not all of the entry's predicate functions are satisfied, the logic waits 530 for a relevant interrupt. While the application 112 is running, external events typically cause interrupts, to which ISRs respond. In an embodiment, events that cause these ISRs include a swap event and the loading of a texture. (In addition, the unloading of a texture, processed for example by the pixel processor 120, may cause a texture to be loaded, which then causes a relevant ISR.) Responsive to these events, an ISR calls the "Attempt to transfer the entry" function described above. As a result, the draw command list logic again determined 520 whether all of the predicate functions associated with the first entry 132 of the draw command list 130 are satisfied.

Once the entry's predicate functions are all satisfied (e.g., the appropriate swap event has occurred and one or more textures are loaded), the entry's draw commands are transferred 540 to the T&L processor 116. After a draw command is transferred, the logic executes 550 any completion functions in the entry 132 and then deletes the completion functions. The entry is then marked 560 "empty," and the logic retrieves 510 the new first entry 132 of the draw command list 130. The transfer of draw commands from the draw command list 130 to the T&L processor 116 thus continues.

While draw commands are being transferred to the T&L processor 116, associated textures are being loaded into the texture memory 118. As described above, an embodiment of the graphics system is able to pre-load textures before the swap event occurs. Pre-loading the textures allows the pixel drawing to occur sooner because the textures are available immediately. In a preferred embodiment, a texture must be loaded into texture memory 118 before it can be used by a draw command, and a texture cannot be unloaded from the texture memory 118 until its use is complete.

In an embodiment, texture loading is accomplished using buffering and synchronization techniques and a lazy texture memory deallocation scheme. The application 112 issues commands to load and unload texture images. The load command allocates texture memory 118 to store a particular texture and transfers the texture to the texture memory 118 if the texture loading path is free. In one embodiment, the load command causes the application to wait for all pending deallocations to occur, if necessary, before allocating texture memory 118 for a new texture. The unload command clears a texture from the texture memory 118 or allows the texture to be overwritten.

Figure 6:
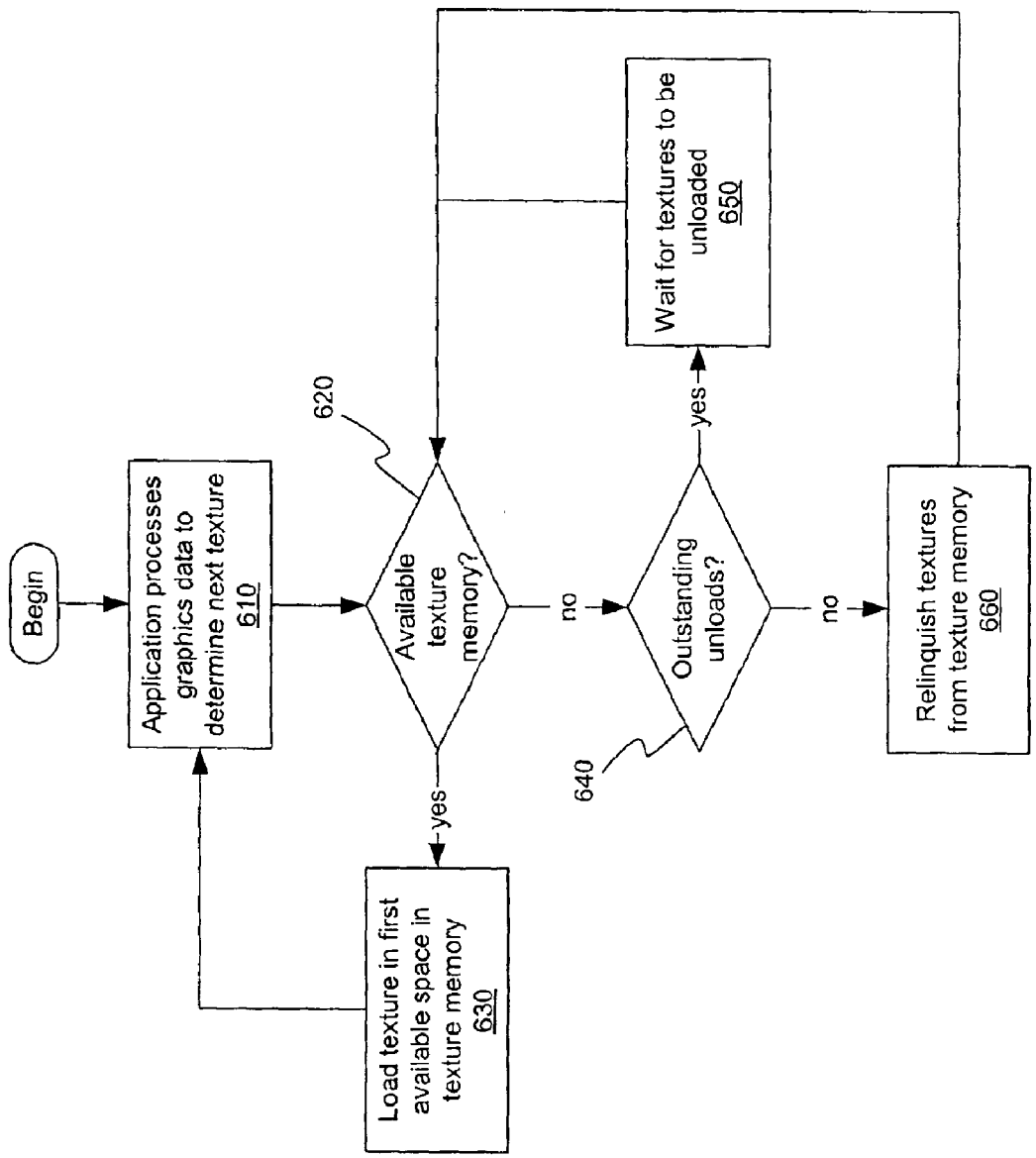
FIG. 6 is a flow of a texture loading process.

In a preferred embodiment, a linear, first-fit placement algorithm is used to determine the texture memory address for loading a texture. A flow diagram of an embodiment of the texture loading scheme is shown in FIG. 6. In accordance with this method, the application processes 610 the graphics data to determine the next texture to load (e.g., the texture associated with the next draw command). The application 112 then determines 620 whether there is available space in the texture memory 118 to load the texture therein. If there is available space in the texture memory 118, the system loads 630 the texture into the first available contiguous space that is large enough to hold the texture. If no such space is found, but there are outstanding requests 640 to relinquish texture memory, the application 112 waits 650 for a texture to be unloaded.

In an embodiment, the application 112 is notified that a texture has been unloaded by an ISR, which is called after the system unloads a texture. If no contiguous space is available after all outstanding requests 640 have finished, a failure indication is returned. In response to this failure indication, the system relinquishes 660 additional textures from the texture memory 118 and attempts to load the texture again. In an embodiment, the application 112 issues an unload instruction for a texture after it has issued all draw commands needing that texture. When this happens, the unload commands also cause a sync token to be put in the draw command list. Accordingly, the unload instruction is not carried out for a particular texture before its associated draw commands have been processed.

The linear, first-fit placement algorithm advantageously simplifies the placement algorithm and memory allocation.

This simplification increases the speed of texture loading, which is highly desirable in graphics-intensive applications. Although the first-fit placement algorithm has been described for loading textures into texture memory, it can be appreciated that any number of known placement algorithms could be used to place textures into the texture memory.

Textures may also be sized or expanded to simplify their placement in texture memory. In an embodiment, textures in the 32- and 24-bit formats have a height that is promoted to at least half of the width of the texture and a width that is promoted to the height or to 64 texels if the height is greater than 64 texels. (A texel is a single pixel of a texture image). For example, an 8 w×32 h texture occupies the memory of a 32 w×32 h texture, while a 32 w×8 h texture occupies the memory of a 32×16 texture. This texture expansion simplifies addressing in the texture memory by aligning the textures on 32-bit address boundaries.

Figure 7:
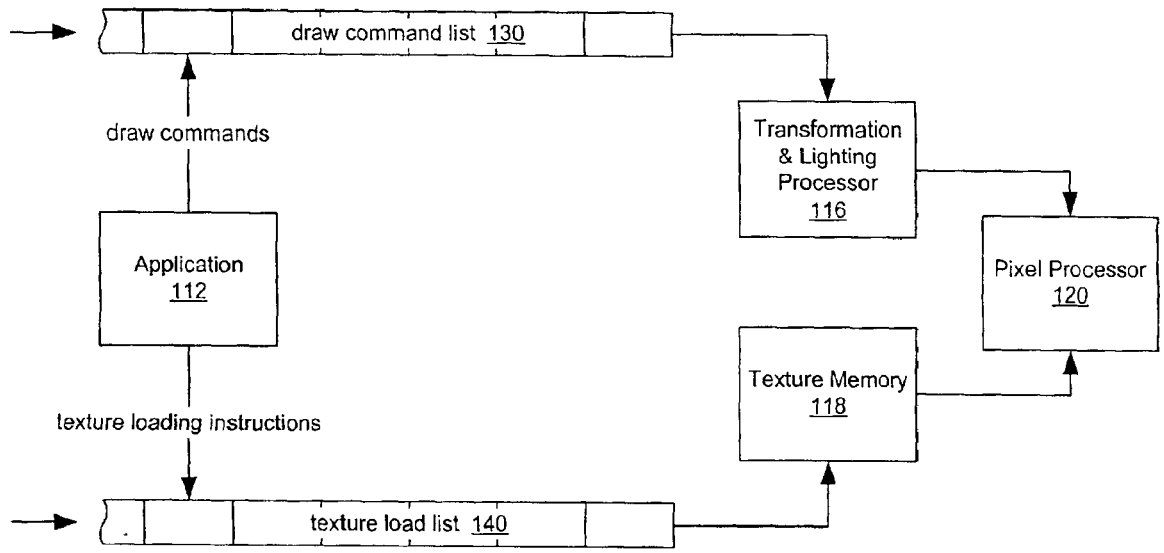
FIG. 7 is a diagram of another embodiment of the draw command and texture load lists.

In another preferred embodiment, the application queues instructions to load textures in a texture load list 140. As shown in FIGS. 1 and 7, an embodiment of the application 112 maintains a texture load list 140 in RAM 104. The texture load list 140 is preferably implemented as a FIFO queue, although there are many other suitable ways to implement the texture load list 140. The texture load list 140 preferably comprises list of entries, each entry containing one or more textures that are to be loaded. Preferably, each texture load entry includes a pointer or other reference to the textures in the memory, rather than the texture data itself. This allows the texture load list to use less memory in the RAM 104 and avoids unnecessary loading of large textures into the texture load list 140.

FIG. 7 shows the draw command list 130 and texture load list 140 in accordance with one embodiment. As the application 112 processes graphics data, it issues draw commands and texture loading instructions. The application 112 sends draw commands to the draw command list 130 (described in connection with FIG. 4A) and sends texture loading instructions to the texture load list 140. The application 112 continues to run while the logic associated with the texture load list 140 (described in connection with FIG. 8) causes the textures to load into texture memory 118 as the memory becomes available. Advantageously, the addition of a texture load list 140 allows the system to continue to process graphics data even when the texture memory is full (e.g., compared to the embodiment shown in FIG. 6, step 650). The texture load list logic may be incorporated within the application 112, or it may run on the CPU 104 as a separate executable.

Figure 8:
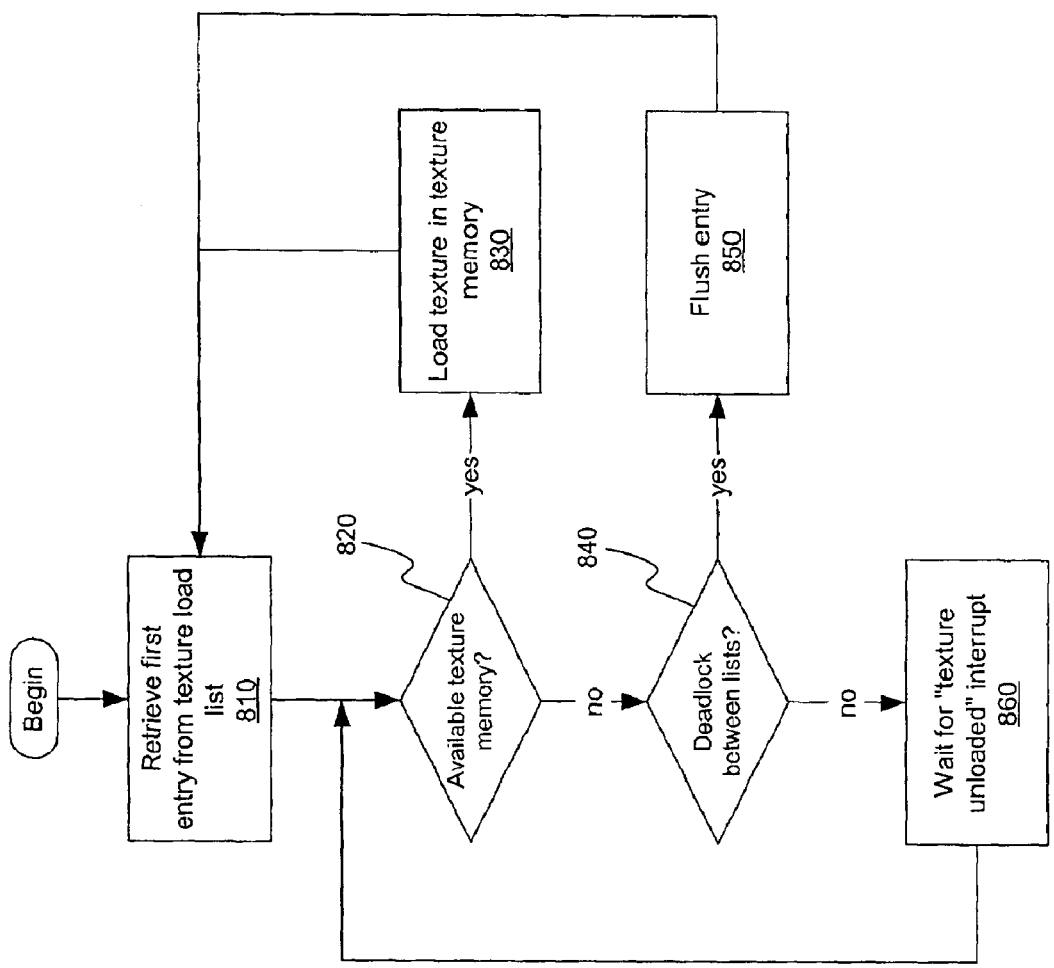
FIG. 8 is a flow of a texture loading process according to another embodiment.

FIG. 8 illustrates a flow of an embodiment for loading textures into texture memory using the texture load list 140. The texture load list logic retrieves 810 the first texture load entry from the queue. The logic then determines 820 whether there is sufficient texture memory to receive the texture in the entry's instruction. In accordance with an embodiment, the logic uses a linear first-fit algorithm to make this determination. If there is sufficient texture memory, the logic causes the texture to load 830 into the texture memory, empties the entry, and then retrieves 810 the new first entry from the texture load list.

If there is not sufficient texture memory, the logic determines 840 whether there is a deadlock between the texture load list 140 and the draw command list 130. Deadlocks between the draw command and texture load lists can occur when each list is waiting for the first entry of the other to be processed before the lists can proceed. For example, the texture load list 140 may be waiting for texture memory 118 to be relinquished (i.e., a texture unload) before a particular texture can be loaded into texture memory 119. At the same time, the first entry of the draw command list 130 may have a predicate function requiring that the texture be loaded before the draw command can be passed to the T&L processor 116 (which in turn may lead to a texture unload). In this situation, a deadlock occurs because the processing of each list is waiting for the other.

In the case of a deadlock, the logic flushes 850 the first entry of one of the lists until the system can proceed. The effect of flushing is to separate multiple draw commands from one entry 132 into two or more entries 132 of the draw command list 130, thereby separating their associated predicate functions as well. This breaks the deadlock because the draw command in the first entry 132 does not have to wait for additional textures to be loaded. Alternatively, the logic may break the deadlock by reordering the entries in one or both lists until the process can proceed. In another embodiment, the application 112 avoids deadlock from occurring by initially not allowing two texture loading predicate functions to be in the same entry of the draw command list. Accordingly, when the application 112 adds draw commands to the draw command list 130, it does not combine draw commands that require different textures into the same entry 132, even if they fit.

In the case where there is no available texture memory 118 and there is no deadlock, the logic waits 860 for an interrupt that indicates a texture has been unloaded. As described above, a texture is unloaded after it is used and is no longer needed for other draw commands. Upon the unloading of a texture, processed for example by the pixel processor 120, the logic again determines 820 whether there is available texture memory 118 to store the texture identified in the first entry of the texture load list 140, and if so, it loads the texture.

Figure 9:
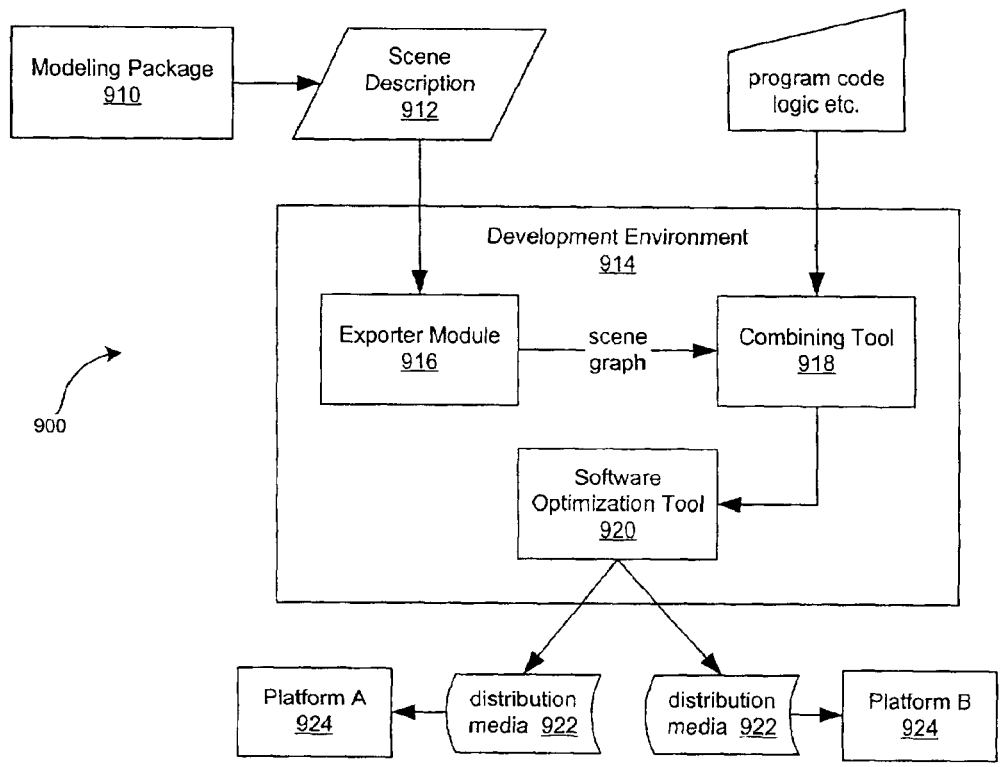
FIG. 9 is a high-level block diagram illustrating the logical environment in which interactive entertainment software, such as a game, is developed.

FIG. 9 is a high-level block diagram illustrating a logical environment 900 in which interactive entertainment software, such as a game, is developed. A developer preferably uses a modeling package 910 to design a scene. The modeling package 910 outputs a scene description 912 that describes the geometry of the scene and the surface effects to apply to the geometry. Preferably, the scene description 912 created by the modeling package 910 is provided to an interactive software development environment 914. The development environment 914 enables a developer to use the 3-D scene in a video game or other type of interactive software. An exporter module 916 within the development environment 914 receives the scene description 912 output by the modeling package 910 and generates a scene graph therefrom. The scene graph is a data structure that hierarchically represents the geometry in the scene and the surface effects to apply to the geometry. A combining tool 918 in the development environment 914 combines the scene graph with the program code logic, audio, and/or other aspects of the interactive software. The output of the combining tool 918 is preferably received by a software optimization tool 920, which optimizes it for one or more target hardware platforms 924, encoded on distribution media 922, such as cartridges, compact disks (CDs), or DVDs for each target hardware platform 924. The end-users execute the optimized software on a hardware platform 924, which causes the scene described by the scene description 912 to be rendered on a television, monitor, or other display device associated with the hardware platform 924.

In another aspect of an embodiment, a development environment 914 is provided for producing an application in accordance with any of the embodiments described herein.

The development environment combines program code received from a developer with the synchronization and list logic required to manage the transfer of draw commands and the loading of textures. Therefore the developer does not have to expressly code these functions during the development process. In one embodiment, the development environment 914 adds code to the application that functions, wherein the added code as an intermediary between the program code and the operating system (OS) of the intended platform 924. This code may be part of the graphics application or may be a separate application that communicates with the graphics application. In another embodiment, the development environment 914 integrates the functions within the application. The combining tool 918, the software optimization tool 920, or both include the necessary code for carrying out the synchronization techniques and buffering logic described herein.

In a simplified example, the development environment 914 receives program code containing graphics commands in the format:

Loop over all drawing objects:
    Load a texture
    Draw with the texture
    Unload the texture It can be appreciated that this code is considerably simpler than code explicitly providing for the draw command buffering and texture loading techniques. By including this functionality on a low level in the application development process that is "invisible" to developers, developers of computer games and other graphics applications obtain the benefits of the invention without having to specifically incorporate the functionalities in each piece of software they write. This decreases the software's time to market and simplifies the task of producing the software on multiple platforms.

The foregoing description of the embodiments of the invention has been presented for the purposes of illustration and description. It is not intended to be exhaustive or to limit the invention to the precise forms disclosed. Persons skilled in the relevant art can appreciate that many modifications and variations are possible in light of the above teaching. It is therefore intended that the scope of the invention be limited not by this detailed description, but rather by the claims appended hereto.

I claim:

1. A method of synchronizing graphics commands in a multi-stage graphics system, comprising:
adding draw commands to entries in a draw command list, the draw commands for drawing graphics on a frame;
associating one or more predicate functions with at least some entries in the list, each predicate function satisfiable upon the occurrence of a condition;
responsive to the satisfaction of the predicate functions associated with each entry, transferring the draw commands in the entry to a next stage in the graphics system; and
loading textures into a texture memory of the graphics system by adding instructions for loading a texture into a texture load list and loading textures into the texture memory according to the texture load list when texture memory is available.

2. The method of claim 1, wherein loading textures comprises:
determining whether a texture can be placed in the texture memory according to a linear, first-fit placement algorithm;
if the determination is positive, loading the texture into the texture memory according to the linear, first-fit placement algorithm.

3. The method of claim 1, wherein whether texture memory is available is determined according to a linear, first-fit placement algorithm.

4. The method of claim 1, wherein entries in the list are stored in queue, and wherein draw commands in the entries in the list are transferred to a next stage of the graphics system in a first in first out order.

5. The method of claim 1, wherein the loading comprises:
scaling a texture to align the texture with an address boundary in the texture memory.

6. The method of claim 5, wherein the texture is aligned on a 32-bit address boundary.

7. The method of claim 1, wherein draw commands are added to entries in the draw command list by adding a reference to the draw commands stored in memory.

8. The method of claim 1, wherein the draw command list comprises a FIFO queue.

9. The method of claim 1, wherein a draw command is associated with a texture, the method further comprising:
associating a predicate function with the entry in the draw command list that holds the draw command associated with the texture, the predicate function satisfied responsive to the texture's being loaded into a texture memory of the graphics system.

10. The method of claim 1, wherein a draw command is associated with a screen buffer in the graphics system, the method further comprising:
associating a predicate function with the entry in the draw command list holding the drawing command, the predicate function satisfied responsive to the screen buffer's being a back buffer.

11. The method of claim 1, further comprising:
associating a completion function with an entry in the draw command list, the completion functions adapted to execute responsive to the associated entry's being transferred to a next stage of the graphics system.

12. The method of claim 1, wherein the graphics system is adapted to execute an interrupt service routine (ISR) responsive to an occurrence of a predetermined event in the graphics system, the ISR being adapted to:
examine the predicate functions associated with a first entry in the drawing command list; and
responsive to a determination that all of the predicate functions associated with the first entry are satisfied, transferring the drawing commands in the entry to the next stage in the computer graphics system.

13. The method of claim 12, wherein the predetermined event is a swap event.

14. The method of claim 12, wherein the predetermined event is a loading of a texture into a texture memory of the graphics system.

15. The method of claim 12, wherein the ISR is a further adapted to:
determine whether a predicate of the first entry in the drawing command list is satisfied; and
responsive to a determination that the predicate is satisfied, indicate that the predicate is satisfied.

16. A method of managing resources in a multi-stage graphics system, comprising:
while the graphics system is drawing a current frame to a display,
processing graphics data associated with a later frame, the graphics data including draw commands associated with one or more textures;

queuing the draw commands for being transferred to graphics hardware, wherein at least some of the draw commands are associated with one or more conditions and at least some of the conditions including whether the textures associated with the draw command have been loaded into a texture memory; and transferring each draw command to a next stage of the graphics system upon the satisfaction of all of the draw command's conditions.

17. The method of claim 16, wherein at least some of the conditions include whether a swap event occurred.

18. The method of claim 16, further comprising loading the textures into a texture memory according to a linear, first-fit placement algorithm.

19. The method of claim 16, further comprising queuing the loading of textures into a texture memory.

20. A computer program product comprising a computer-readable medium having computer program code embodied therein for managing graphics resources, the computer program code comprising:

a graphics module for processing draw commands, the draw commands associated with one or more textures;

a draw entry module adapted to maintain a draw command list of draw entries, each draw entry containing one or more draw commands, wherein at least some draw entries further contain one or more predicate functions satisfiable upon the occurrence of a condition, at least one of the predicate functions being satisfied if a particular texture has been loaded into the texture memory; and a draw entry logic module adapted to transfer each draw entry's draw commands for processing if all of the draw entry's predicate functions are satisfied.

21. The computer program product of claim 20, further comprising:

a texture loading module adapted to load textures into a texture memory according to a linear, first-fit placement algorithm.

22. The computer program product of claim 20, further comprising:

a texture load list module adapted to add instructions for loading textures to a texture load list; and a loading list logic module adapted to load textures into the texture memory when texture memory is available according to the texture load list.

23. The computer program product of claim 20, wherein a predicate function is satisfied upon a swap event.

24. The computer program product of claim 20, wherein each draw entry contains a reference to one or more draw commands stored in a memory.

25. A computer program development environment for producing a computer program product, the computer program product comprising:

a graphics module for processing draw commands, the draw commands associated with one or more textures;

a draw entry module adapted to maintain a draw command list of draw entries, each draw entry containing one or more draw commands, wherein at least some draw entries further contain one or more predicate functions satisfiable upon the occurrence of a condition, at least one of the predicate functions being satisfied if a particular texture has been loaded into the texture memory; and a draw entry logic module adapted to transfer each draw entry's draw commands for processing if all of the draw entry's predicate functions are satisfied.

26. The computer program product of claim 25, further comprising:

a texture loading module adapted to load textures into a texture memory according to a linear, first-fit placement algorithm.

27. The computer program product of claim 25, further comprising:

a texture load list module adapted to add instructions for loading textures into a texture load list; and a loading list logic module adapted to load textures into the texture memory when texture memory is available according to the texture load list.

28. The computer program product of claim 25, wherein a predicate function is satisfied upon a swap event.

29. The computer program product of claim 25, wherein each draw entry contains a reference to one or more draw commands stored in a memory.

30. A method of developing a computer program product, the method comprising:

receiving graphics data and program code from a developer; and combining the graphics data and program code with:
   a graphics module for processing draw commands, the draw commands associated with the graphics data,
   a draw entry module adapted to maintain a list of entries, each entry containing one or more draw commands, wherein at least some entries further contain one or more predicate functions satisfiable upon the occurrence of a condition,
   a list logic module adapted to transfer each entry's draw commands for processing if all of the entry's predicate functions are satisfied,
   a texture load list module adapted to add instructions for loading textures into a texture load list, and
   a loading list logic module adapted to load textures into the texture memory when texture memory is available according to the texture load list;

thereby yielding the computer program product.

31. The method of claim 30, wherein combining further comprises combining the graphics data and program code with:

a texture loading module adapted to load textures into a texture memory according to a linear, first-fit placement algorithm.

32. The method of claim 30, further comprising:

optimizing the computer program product to create a plurality of applications compatible with different hardware platforms.

* * * * *